(12) United States Patent
Younger

(10) Patent No.: US 6,287,231 B1
(45) Date of Patent: Sep. 11, 2001

(54) METHODS AND SYSTEMS FOR IMPROVING THE OPERATION OF TRANSMISSIONS FOR MOTOR VEHICLES

(76) Inventor: Gilbert W. Younger, 2621 Merced Ave., El Monte, CA (US) 91733

( * ) Notice: Subject to any disclaimer, the term of this patent is extended or adjusted under 35 U.S.C. 154(b) by 0 days.

(21) Appl. No.: 09/575,356

(22) Filed: May 19, 2000

Related U.S. Application Data

(62) Division of application No. 09/447,371, filed on Nov. 23, 1999, now Pat. No. 6,099,429, which is a division of application No. 09/314,618, filed on May 19, 1999, which is a continuation of application No. 08/871,229, filed on Jun. 9, 1997, now Pat. No. 5,967,928.

(51) Int. Cl.$^7$ ................................................ F16H 31/00
(52) U.S. Cl. ........................ 475/120; 475/127; 475/122
(58) Field of Search .................................. 475/120, 121, 475/122, 127, 128, 129, 131

(56) References Cited

U.S. PATENT DOCUMENTS

| | | |
|---|---|---|
| 3,710,652 | 1/1973 | Miyazaki . |
| 3,885,389 * | 5/1975 | Hull ....................................... 60/453 |
| 4,023,447 | 5/1977 | Sakai et al. . |
| 4,106,369 | 8/1978 | Taga . |
| 4,248,106 | 2/1981 | Iwanaga et al. . |
| 4,306,469 | 12/1981 | Iwanaga et al. . |
| 4,395,926 | 8/1983 | Kubo et al. . |
| 4,449,426 | 5/1984 | Younger ................................. 74/867 |
| 4,495,839 | 1/1985 | Morscheck . |
| 4,527,448 | 7/1985 | Person et al. ........................... 74/869 |
| 4,541,308 | 9/1985 | Person et al. ........................... 74/868 |
| 4,566,355 | 1/1986 | Sugano . |
| 4,711,140 | 12/1987 | Younger ................................. 74/865 |
| 4,790,938 | 12/1988 | Younger ............................... 210/484 |
| 4,829,852 | 5/1989 | Sakakiyama . |
| 4,858,498 | 8/1989 | Bouda . |
| 5,253,549 | 10/1993 | Younger ................................. 74/867 |
| 5,540,628 | 7/1996 | Younger . |
| 5,624,342 | 4/1997 | Younger . |
| 5,730,685 | 3/1998 | Younger . |
| 5,743,823 | 4/1998 | Younger ............................... 475/120 |
| 5,768,953 | 6/1998 | Younger ............................. 74/606 R |
| 5,820,507 | 10/1998 | Younger ............................... 475/116 |

FOREIGN PATENT DOCUMENTS

2181216 * 4/1987 (GB) .
2187534 * 9/1987 (GB) .

OTHER PUBLICATIONS

Hydra–Matic 4L80–E—Technicians Guide, General Motors Corporation, 1990.

* cited by examiner

Primary Examiner—Sherry Estremsky
Assistant Examiner—Tisha D. Lewis
(74) Attorney, Agent, or Firm—Mark P. Stone

(57) ABSTRACT

Methods and systems for improving the operation of a transmission for an automotive vehicle, and in particular the transmission as installed by the original automobile manufacturer. Are provided for modifying the original hydraulic fluid circuits of the automotive transmission provided by the automobile manufacturer to enable the transmission to select first gear at any time, and to enable the transmission to produce quick applies during upshifts and fast releases during downshifts for high performance operation with only minimum ratio sharing or overlap during gear changes. The modification of the original automotive transmission to achieve these goals includes modification of the hydraulic fluid circuits of the factory installed transmission; by enlarging the size of pre-existing orifices and by plugging other orifices; and by adjusting pre-existing spring and pressure values for adjusting the fluid flow and operation of the original factory installed automotive transmission.

4 Claims, 4 Drawing Sheets

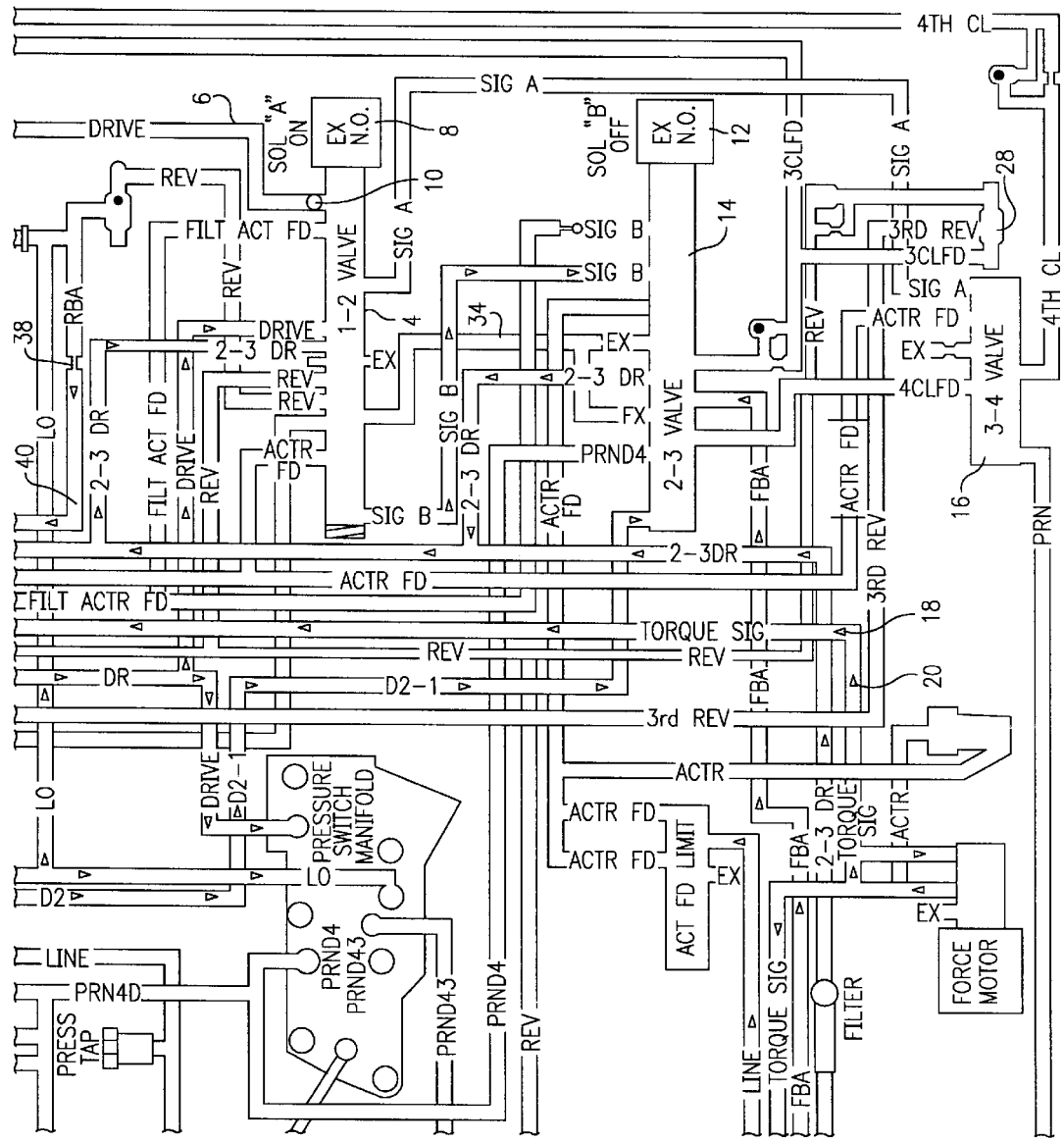
FIG. ID

METHODS AND SYSTEMS FOR IMPROVING THE OPERATION OF TRANSMISSIONS FOR MOTOR VEHICLES

The present application is a divisional of Ser. No. 09/447,371, filed Nov. 23, 1999 now U.S. Pat. No. 6,099,429, which is a divisional of Ser. No. 09/314,618, filed May 19, 1999, which is a continuation of Ser. No. 08/871,229, filed Jun. 9, 1997 (now U.S. Pat. No. 5,967,928, issued Oct. 19, 1999).

BACKGROUND OF THE INVENTION

The methods and systems of the present invention are directed to the modification and improvement of transmissions for automotive vehicles of the type installed by the original equipment manufacturers. The invention is particularly directed to the improvement and modification of the automotive transmissions commonly known as the "4L80E" or the "Hydramatic 4L80E" which are "factory installed" in automotive vehicles manufactured by General Motors Corporation.

The present inventor owns U.S. Pat. No. 5,253,549, issued Oct. 19, 1993 and entitled "Methods And Systems For Improving The Operation Of Automatic Transmissions For Vehicles"; U.S. Pat. No. 4,790,938, issued on Dec. 13, 1988 and entitled "Filter For Removing Particulate Matter From Fluid Within A Movable Body"; U.S. Pat. No. 4,711,140, issued Dec. 8, 1987 and entitled "Throttle Valve System For Automatic Transmission"; U.S. Pat. No. 4,449,426, issued on May 22, 1984 and entitled "Laminated Separator Plate Means For Recalibrating Automatic Transmission"; U.S. patent application Ser. No. 08/333,552, filed Nov. 2, 1994 and entitled "Methods And Systems For Improving The Operation Of Transmissions For Motor Vehicles" (now U.S. Pat. No. 5,540,628, issued Jul. 30, 1996); U.S. patent application Ser. No. 08/494,844, filed Jun. 26, 1995 and entitled "Methods And Systems For Improving The Operation Of Transmissions For Motor Vehicles" (now U.S. Pat. No. 5,624,342, issued Apr. 29, 1997); U.S. patent application Ser. No. 08/515,098, filed Aug. 14, 1995 (now U.S. Pat. No. 5,730,685, issued Mar. 24, 1998) and entitled "Methods And Systems For Improving The Operation Of Transmissions For Motor Vehicles; U.S. patent application Ser. No. 08/595,810, filed Feb. 2, 1996 (now U.S. Pat. No. 5,743,823, issued Apr. 28, 1998) entitled "Methods And Systems For Improving The Operation Of Transmissions For Motor Vehicles"; U.S. patent application Ser. No. 08/697,625, filed Aug. 28, 1996 (now U.S. Pat. No. 5,768,953, issued Jun. 23, 19998) and entitled "Methods And Systems For Improving The Operation of Transmissions For Motor Vehicles"; and U.S. patent application Ser. No. 08/816,715, filed Mar. 13, 1997 (now U.S. Pat. No. 5,820,507, issued Oct. 13, 1998) and entitled "Methods And Systems For Improving The Operation Of Transmission For Motor Vehicles". The basic operation of transmissions for automotive vehicles is discussed in the aforementioned patents and patent applications, and these patents and patent applications are expressly incorporated by reference into the disclosure of the present patent application.

The basic principles of operation of the factory installed General Motors 4L80E transmission for automotive vehicles, including the specific modes of operation thereof and the hydraulic circuits and interrelationship of hydraulic circuits, are well known to those skilled in the automotive transmission art. Attention is respectfully invited to the operations manual and text entitled HYDRA-MATIC 4L80—E TECHNICIAN'S GUIDE (1990), published by General Motors Corporation, said publication describing in detail the operation of the "factory installed" 4L80E General Motors transmission, including a discussion of the structure, the hydraulic circuits, and the interrelationship between the structure and the hydraulic circuitry and fluid flow during normal operation of the transmissions in automotive vehicles. The disclosure of the aforementioned publication in its entirety is expressly incorporated by reference into the disclosure of the present patent application as disclosing and illustrating background material known to those of ordinary skill in the automotive transmission art.

In the original design of the 4L80E "factory installed" transmission, the first gear ratio cannot be obtained above a vehicle speed of approximately 35 miles per hour. (See the aforementioned General Motors Corporation publication). A primary object of the present invention is to enable the driver of a vehicle having a 4L80E General Motors transmission to select first gear at any time, thereby enabling the driver to obtain a "first" gear ratio whenever the gear selector lever is placed in the "1" position without regard to the actual vehicle speed and engine rotational speed. This objective is accomplished by modification of the structure and operation of the existing hydraulic circuits of the original transmission and the addition of a new hydraulic circuits to the original transmission.

It is also desirable to modify the "factory installed" automotive transmission to result in quick application during upshifts and quick release forces during downshifts with minimum ratio sharing (overlap) during gear changes, for improved performance particularly when the vehicle is operates at high performance conditions such as racing applications. This object is obtained by varying the structure and operation of the hydraulic circuits of the original transmission to enlarge or reduce existing orifices to control the apply and release fluid flow through the hydraulic circuits, in conjunction with the modification of different spring and pressure values of the pre-existing hydraulic circuits of the factory installed transmission.

Other objects, improvements and advantages of the present invention will become apparent to those skilled in the art from the following description in conjunction with the drawings.

SUMMARY OF THE INVENTION

Methods, apparatus and systems are provided for modifying the structure, operation, and functional relationship of structure in "factory installed" transmissions for automotive vehicles. In accordance with the present invention, the transmission identified as 4L80E installed in General Motors Corporation vehicles are modified to enable the driver to obtain a first ratio whenever the gear selector is placed in the first position without regard to actual vehicle speed or engine rotational speed. In the original "factory installed" transmission, the first ratio cannot be obtained for vehicle speeds exceeding approximately 35 miles per hour. The original transmission is modified to achieve this result by providing a fluid flow passageway between the manual valve and a "1-2" shift valve to apply sufficient fluid pressure to one end of the shift valve to maintain it in a downshifted (first gear) position whenever a gear selector operatively associated with the manual valve is moved into the first gear selection position. Means are provided to prevent exhaust of fluid through the added passageway when the manual valve (and the gear selector lever) is not in the first gear selection position.

The present invention also modifies the aforementioned "factory installed" automotive transmission by producing quick "applies" and "releases" with minimum ratio sharing (overlap), which is advantageous in improving performance when the vehicle is used for high performance operations such as racing. These further modifications to the operation of the original transmissions are achieved by enlarging or reducing (or plugging) orifices in the original hydraulic circuitry to modify fluid flow therethrough for controlling the apply and release fluid flow. Additionally, adjustments are made to spring and pressure values of the original transmission hydraulic circuitry.

Accordingly, the object of the present invention is to modify the operation of existing "factory installed" automotive transmissions, and in particular the General Motors Corporation 4L80E transmission, to result in changes to the hydraulic circuitry and fluid flow therethrough to enable the driver of the vehicle to select first gear ratio without regard to actual vehicle speed or engine rotational speed, and to produce quick applies and releases which are particularly advantageous for high performance applications. Other advantages and improvements of the methods, systems and apparatus of the present invention will become apparent to those skilled in the automotive transmission art from the following discussion in conjunction with the enclosed drawings.

BRIEF DESCRIPTION OF THE DRAWINGS

FIGS. 1A, 1B, 1C and 1D illustrate the hydraulic circuitry of the factory installed General Motors Corporation 4L80-E automotive transmission for "Manual First" as modified in accordance with the present invention.

DESCRIPTION OF THE BEST MODES FOR CARRYING OUT THE INVENTION

The present invention is directed to improvements and modifications to existing "factory installed" automotive transmissions, and in particular the transmission known as General Motors Corporation 4L80E or Hydramatic 4L80E. The objects of the present invention include modification of the structure, hydraulic circuitry, interrelationship of structure and fluid flow patterns through the hydraulic circuitry of the original factory installed transmission for the purpose of 1). enabling the driver to select first gear ratio without regard to actual vehicle speed or engine rotational speed, and 2) to control the fluid flow through the hydraulic circuitry in order to produce quick apply forces during upshifts and quick releases during downshifts with minimum ratio sharing (overlap) during gear changes. The modifications to the original operation and hydraulic circuitry of the "factory installed" automotive transmissions are made by modifying fluid flow passageways between different components of the original transmission, and by modifying the flow through existing hydraulic circuitry by enlarging or reducing the size of fluid flow orifices and adjusting existing spring and pressure values.

The disclosure of the Applicant's aforementioned prior U.S. Pat. Nos. 5,253,549; 4,790,938; 4,711,140; 4,449,426; 5,540,628; and 5,624,342 are expressly incorporated by reference into the disclosure of the present patent application. The disclosure of Applicant's U.S. Pat. Nos. 5,730,685; 5,743,823; 5,768,953; and 5,820,507 Mar. 13, 1997; are also expressly incorporated by reference into the disclosure of the present patent application. Additionally, the disclosure of the aforementioned General Motors Corporation operating manual entitled Hydra-Matic 4E80-E Technician's Guide (1990), which discloses in detail the structure and operation of the "factory installed" General Motors Corporation 4L80-E automotive transmission, is expressly incorporated by reference into the disclosure of the present patent application as describing and illustrating basic operating principles of the hydraulic circuitry of the known automotive transmission which constitutes background information to the improvements of the present invention.

Figure 1A:
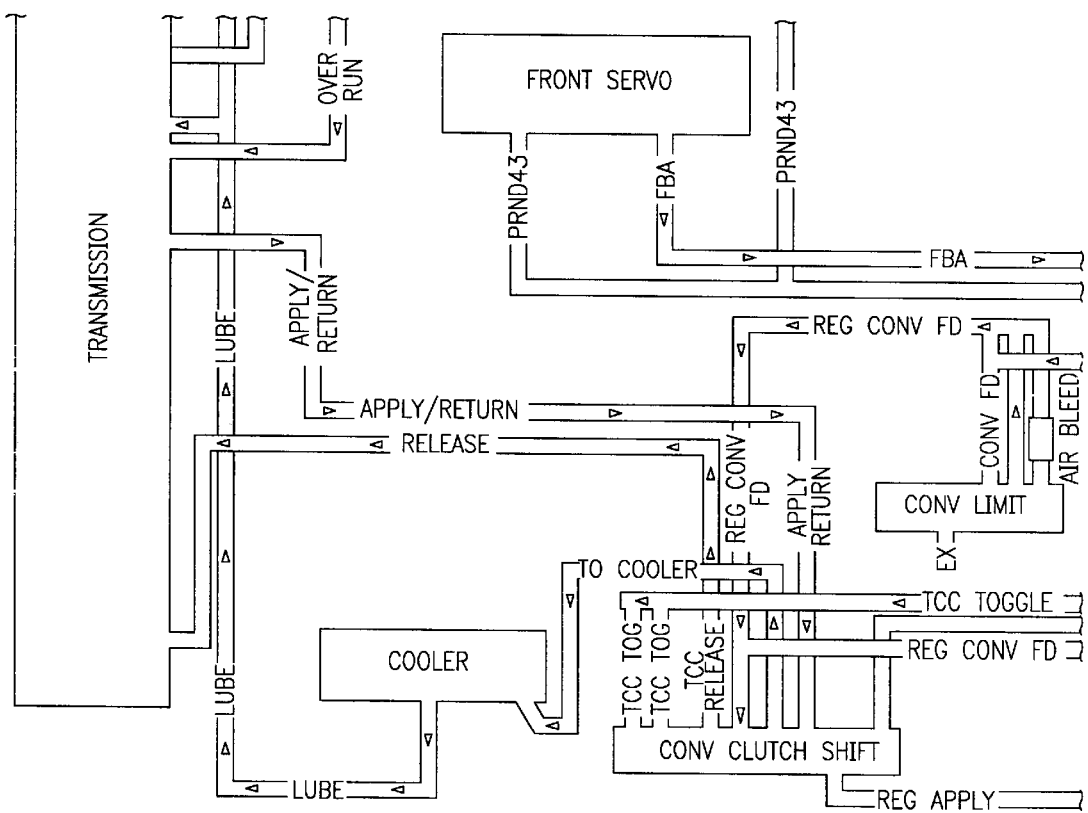
Figure 1B:
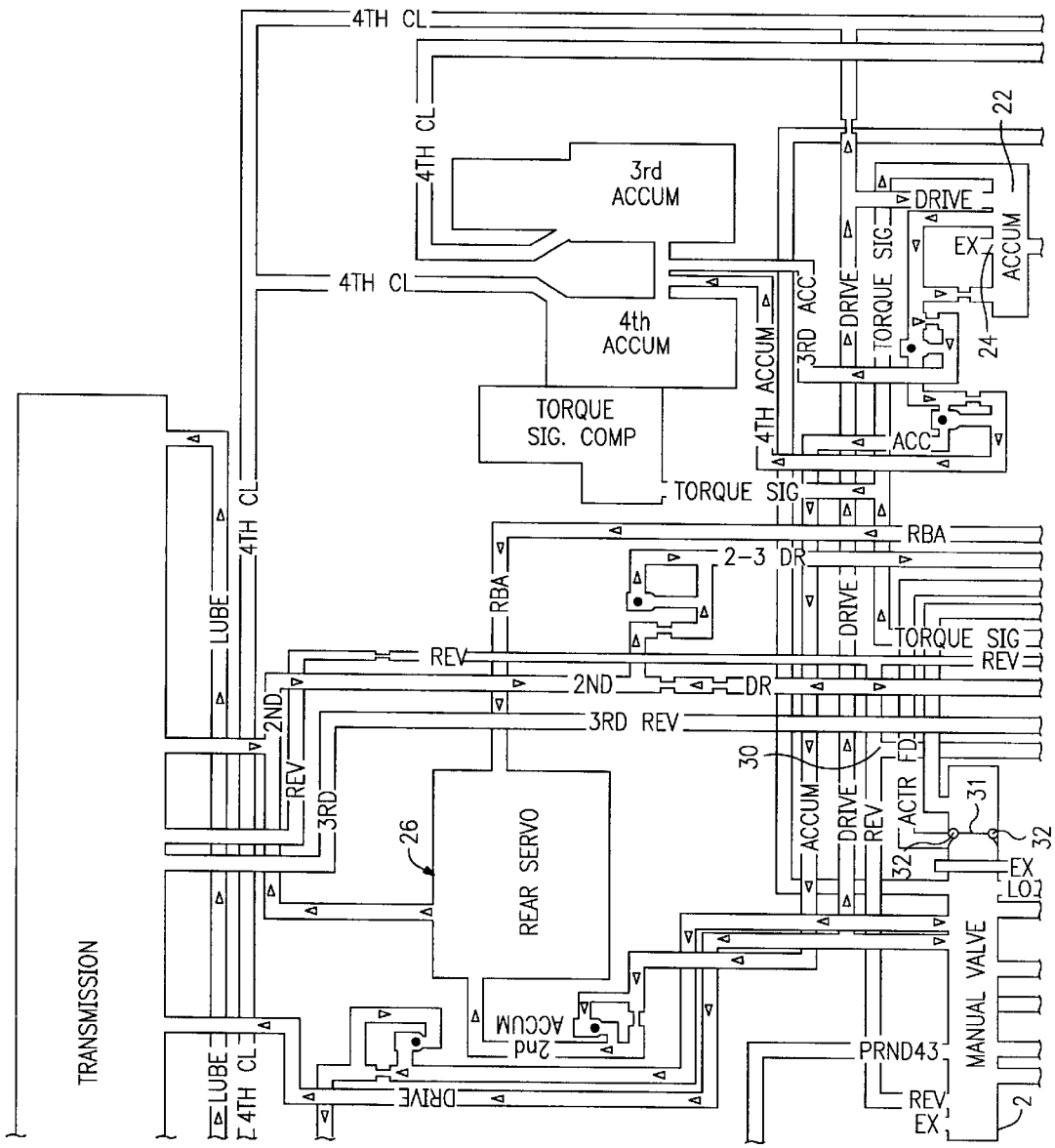
Figure 1C:
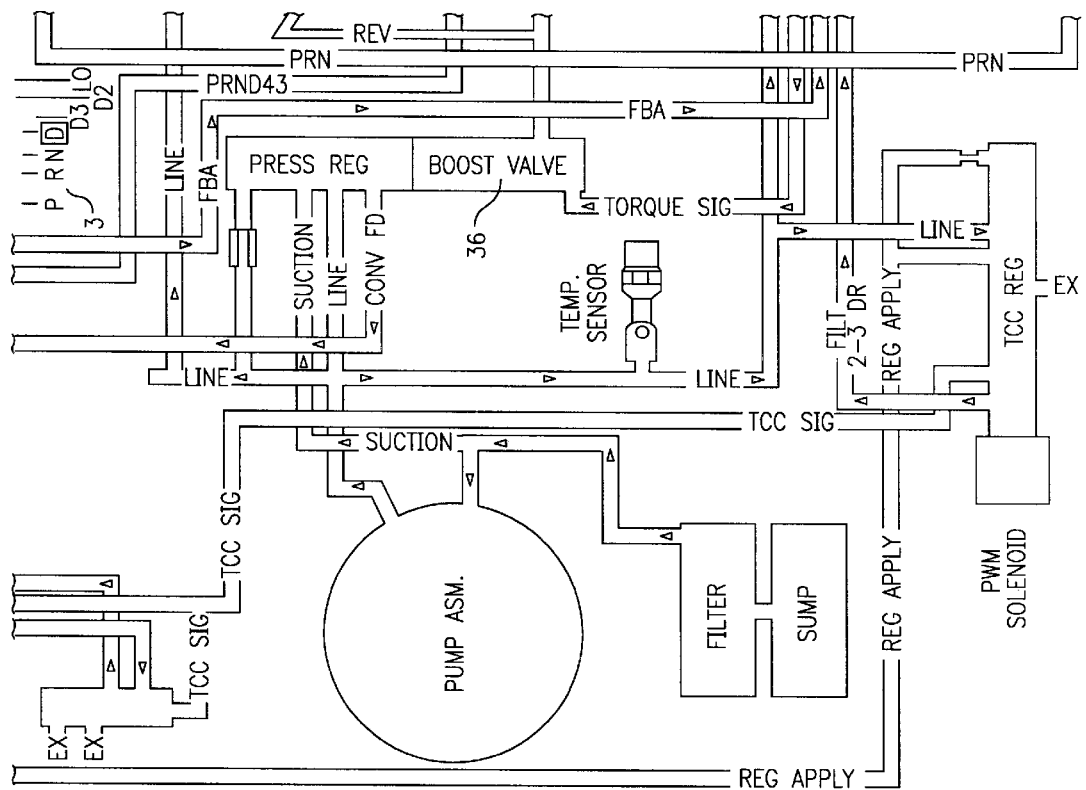

FIGS. 1A, 1B, 1C and 1D illustrate the 4L80-E automotive transmission, as modified from the "factory installed" mode of operation in accordance with the preferred embodiments of the present invention.

The prior art operation of the "factory installed" 4L80-E automotive transmission will be briefly described as follows. Attention is directed to the Hydra-Matic 4L80-E Technician's Guide General Motors Publication for a more detailed description of the operation of this "factory installed" transmission. Manual First is available to the driver when vehicle operating conditions require maximum engine compression to slow the vehicle, or maintain maximum transfer of engine torque to the vehicle drive shaft. Under normal operating conditions in Manual First, the transmission is prevented from upshifting past first gear. When Manual First is selected while operating in either second, third or fourth gears, the factory installed transmission will not immediately downshift into first gear. Vehicle speed must be below approximately 35 mph before the factory installed transmission will downshift into first gear. When the vehicle is operating above this speed, the transmission will operate in a Manual First-Second Gear condition until the vehicle speed decreases sufficiently. Moreover, to avoid excessive engine rotational speeds or over-revving in the first gear selection position of the gear selector lever, the factory installed "1-2" shift valve was allowed to upshift to second gear position by exhausting fluid through an associated solenoid valve when a predetermined engine rotational speed is exceeded.

FIGS. 1A, 1B, 1C and 1D illustrate the "factory installed" hydraulic circuit for the 4L80-E transmission, as modified to achieve the improvements in accordance with the present invention. To modify the factory installed transmission to permit selection of the first gear ratio without regard to vehicle speed (e.g., when the vehicle speed exceeds approximately 35 miles per hour), fluid flow means are provided directly between a manual valve and a "1-2" shift valve. Referring to the drawing, the manual valve is generally designated by reference numeral 2, the gear selector lever operatively associated with the manual valve is designated by reference numeral 3, the "1-2" shift valve is generally designated by reference numeral 4, and the means for coupling the manual valve and the 1-2 shift valve in fluid flow relationship is generally designated by passageway 6. The passageway 6 permits the flow of low oil from the manual valve, when the manual valve is in a first gear selector position, to the right end of the "1-2" shift valve as illustrated in the drawing. The right end of valve 4 is its "upshifted" end, and a spring associated with the valve 4 exerts a resilient force thereon urging the valve into its upshifted position (i.e., towards the right as illustrated in the drawing). Low oil is supplied from the manual valve to the upshifted end of valve 4 through the passageway 6, when the manual valve is in its first gear selection position. The fluid applied to the upshifted end of the valve 4 is sufficient to exert a pressure thereon to overcome the opposed resilient force urging the valve 4 into its upshifted position. Accordingly, the shift valve 4 is maintained in its downshifted position (e.g., to the left as illustrated in the drawing figure) when the manual valve 2 (and thus the gear selector 3) is in its first gear position, and low oil is applied to the right end of the valve 4 through the passageway 6. The shift valve 4 is therefore maintained in its downshifted position whenever the gear selector is in the first gear position without regard to actual vehicle speed or actual engine rotational speed.

A solenoid valve, generally designated by reference numeral 8, is in fluid communication with the upshifted end of the shift valve 4. The solenoid valve is normally opened (in its "off" position) to permit fluid to exhaust through the solenoid, thereby allowing the resilient force applied to the valve 4 to overcome fluid pressure at the upshifted end of the valve 4 to cause the valve to upshift. However, when the manual valve 2 is in its first gear selection position and low oil is applied to the upshifted end of the valve 4 through the passageway 6, the fluid pressure exerted on the right end of the valve is sufficient to both overcome the opened exhaust at the solenoid 8 and to oppose the resilient force on the valve urging it in a rightward direction. Accordingly, the shift valve 4 is maintained in its downshifted position as a result of the applied fluid pressure to the right end of the valve as long as the manual valve (and thus the associated gear selector lever 3) is in the first gear selection position, without regard to actual vehicle speed or actual engine rotational speed.

When the gear selector lever is moved to move the manual valve out from the first gear selection position, no fluid flows through passageway 6, but fluid is exhausted through the opened solenoid 8 to permit the valve 4 to upshift by removing the opposed fluid pressure applied to the right end of the valve 4. Manual lo/1st oil is also exhausted through the manual valve when the gear selector is moved out of the first gear position. Accordingly, when the gear selector is not in the first gear selection position, no fluid flows through passageway 6, which becomes an opened exhaust. Means, designated by reference numeral 10, are provided to prevent fluid from exhausting from the valve 4 through passageway 6 when the manual valve is not in the first gear selection position and passageway 6 is an opened exhaust. Such means 10 comprises a check ball provided proximate to the location at which the end of the passageway 6 remote from the manual valve 2 intersects the upshifted end of the shift valve 4. In this manner, fluid flowing through the passageway 6 is applied to the upshifted end of the valve 4 when the manual valve 2 is in the first gear selection position, but no fluid is permitted to flow from the valve 4 through the passageway 6 when the manual valve 2 is moved out of the first gear selection position.

As discussed above, when the manual valve is moved into the first gear position, the transmission is not capable of upshifting because pressure of the low oil applied to the upshifted end of the valve 4 through the passageway 6 prevents the valve from moving into its rightward upshifted position, without regard to actual vehicle speed or engine rotational speed. When the gear selector is moved out of the first gear position, manual lo/1st oil is exhausted through both the manual valve and the opened solenoid 8 coupled to the upshifted end of valve 4 so that the resilient force applied to the left end of the valve 4 overcomes any fluid pressure applied to the right end of the valve 4. The solenoid 8 is electronically opened when the gear selector (manual valve) is moved out of the first gear selection position to exhaust fluid (e.g., Sig A oil) from the opened solenoid 8.

The "factory installed" 4L80E transmission is designed to hold first gear when the gear selector is moved into the 1 position. In the 2 position, the transmission holds second gear from upshifting to 3rd, holds 3rd gear when the gear selector lever is in the manual 3rd position, and shifts from 1st through 4th when starting in the OD (overdrive) position. This is accomplished by means of electronic controls in the "factory installed" transmission.

In the 2nd gear selector position, filtered actuator feed (FAF) solenoid pressure exhausts from two normally opened solenoids which are normally in their "off" position—namely, solenoid 8 coupled to the upshifted end of the "1-2" shift valve 4, and a solenoid. 12 coupled to the "downshifted" end of a "2-3" shift valve designated by reference numeral 14. The "2-3" shift valve 14 is prevented from upshifting (moving leftward as shown in the drawing), by line pressure and a resilient force applied by a spring to the left end (i.e., the upshifted end) of the shift valve 14.

When the gear selector lever 3 moves the manual valve 2 into the 3rd gear selection position, the transmission cannot upshift to 4th gear because the manual valve does not route fluid at line pressure to a "3-4" shift valve, designated by reference numeral 16, until the gear selector lever is moved into the OD (overdrive) position.

In accordance with a further object of the present invention, fluid flow through the hydraulic circuitry of the factory installed 4L80E transmission is modified for high performance applications, including racing. An opening is provided in a torque signal line, designated by reference numeral 18, at a location designated by reference numeral 20. A pressure relief valve (not shown) is connected to the torque signal circuit by coupling the pressure relief valve in fluid flow relationship to the line 18. In the preferred embodiment of the invention, the opening is substantially $3/16$ inch in diameter.

An opening is provided in an accumulator, designated by reference numeral 22, at a location designated by reference numeral 24 to permit the exhaust of cross leaks of fluid at the accumulator valve 22. The exhaust of low oil acting on the accumulator valve decreases accumulator pressure so that it does not equal line pressure when the manual valve is in the first gear selection position. At vehicle speeds above approximately 35 m.p.h., solenoid 8 is de-energized by a computer in the "factory installed" transmission which routes 2nd oil to the spring end of a rear servo, designated by reference numeral 26, to prevent application of a rear band whenever the manual valve 2 (the gear selector 3) is moved into a first gear selection position.

Further modifications to the "factory installed" transmission include connecting third circuit to reverse circuit by removing a check ball at the location designated by reference numeral 28. This allows 3rd oil to act on both halves of a third clutch piston increasing the capacity of the third clutch. Normally, only the inner area of the third piston is used in third gear. The reverse circuit is now blocked at the location designated by reference numeral 30 to prevent exhausting of 3rd oil from the reverse passage while the transmission is in the 3rd gear selection position.

A tapered plug with an O-ring, designated by reference numeral 32, provides a seal for the actuator filter to prevent actuator oil leaks resulting from broken plastic filters which are common on the factory installed 4L80-E transmission. The elimination of actuator oil leaks will help to eliminate improper upshifting of the "factory installed" transmission.

A line or passageway designated by reference numeral 34 is provided between the 1-2 shift valve 4 and the 2-3 shift valve 14. Passageway 34 re-routes fluid (i.e., reverse oil) after the "factory installed" hydraulic circuit is blocked at the location designated by reference numeral 30. Undesirable high line pressure, which is characteristic of the "factory installed" 4L80-E transmission and may result in breakage of components, is prevented or reduced in accordance with the present invention in two separate ways. As discussed above, the addition of a pressure relief valve (not shown in the drawing) to the torque signal oil line designated by reference numeral 18, prevents pressure in the line 18 from exceeding approximately 90 lbs. per square inch (p.s.i). Additionally, a new boost valve, designated generally by reference numeral 36, replaces the "factory installed" boost valve. The replacement boost valve 36 includes lands which are designed to be wider than those of the "factory installed" boost valve to stabilize locking tendencies of this valve and prevent wear inside the boost valve bushing. The wider lands of the new boost valve 36 provide a new seal by seating against unworn areas of a worn factory sleeve so that the worn sleeve can be reused with the new boost valve 36.

Further modifications to the "factory installed" 4L80-E transmission include enlarging orifices at locations designated by reference numerals at the 1-2 feed, at the 3rd feed, at the 4th feed, at the 3rd exhaust, and at the opening provided at location 20 in the torque signal line 18. Additionally, orifices are plugged at the low oil line coupled to the accumulator valve, at the factory installed 3rd exhaust, and at the factory installed reverse feed. An orifice 38 in the rear band apply line 40 is reduced to reduce the rate of apply of the rear band when the gear selector lever 3 (and the manual valve 2) is moved into the first gear position so that the rear band does not apply too quickly to lock the rear wheels during a sudden downshift into first gear.

Further modifications to the "factory installed" 4L80-E transmission include replacement of the original 3rd accumulator spring with a spring for providing firmer 2-3 shifts; replacing the "factory installed" pressure regulator spring to apply approximately 20 lbs. per square inch higher overall line pressure; and replacing the "factory installed" 1-2 accumulator spring with a replacement spring for shortening the stroke of a "1-2" shift.

Other features and advantages within the scope of the present invention will become apparent to those skilled in the relevant art. Accordingly, the description of the preferred embodiments of the invention herein is intended to be illustrative only, and not restrictive of the scope of the invention, that scope being defined by the following claims and all equivalents thereto.

What is claimed is:

1. A method for modifying the hydraulic circuitry of a 4L80-E automotive transmission of the type including an actuator filter for filtering actuator oil, the steps of said method including:

sealing said actuator filter by providing a tapered plug operatively associated with said actuator filter for preventing actuator oil leaks in said hydraulic circuitry of said 4L80-E automotive transmission.

2. The method of claim 1 further including the step of providing said tapered plug with an O-ring for further sealing of said actuator filter by said tapered plug.

3. A method for modifying the hydraulic circuitry of an automotive transmission of the type including an actuator filter for filtering actuator oil, the steps of said method including:

sealing said actuator filter by providing a tapered plug operatively associated with said actuator filter for preventing actuator oil leaks in said hydraulic circuitry of said automotive transmission.

4. The method of claim 3 further including the step of providing said tapered plug with an O-ring for further sealing of said actuator filter by said tapered plug.

* * * * *